June 24, 1947. J. BUEGELEISEN 2,423,003
MOTORCYCLE SADDLE BAG
Filed March 11, 1946 2 Sheets-Sheet 1

INVENTOR.
JOSEPH BUEGELEISEN
BY
ATTORNEYS

June 24, 1947. J. BUEGELEISEN 2,423,003
MOTORCYCLE SADDLE BAG
Filed March 11, 1946 2 Sheets-Sheet 2
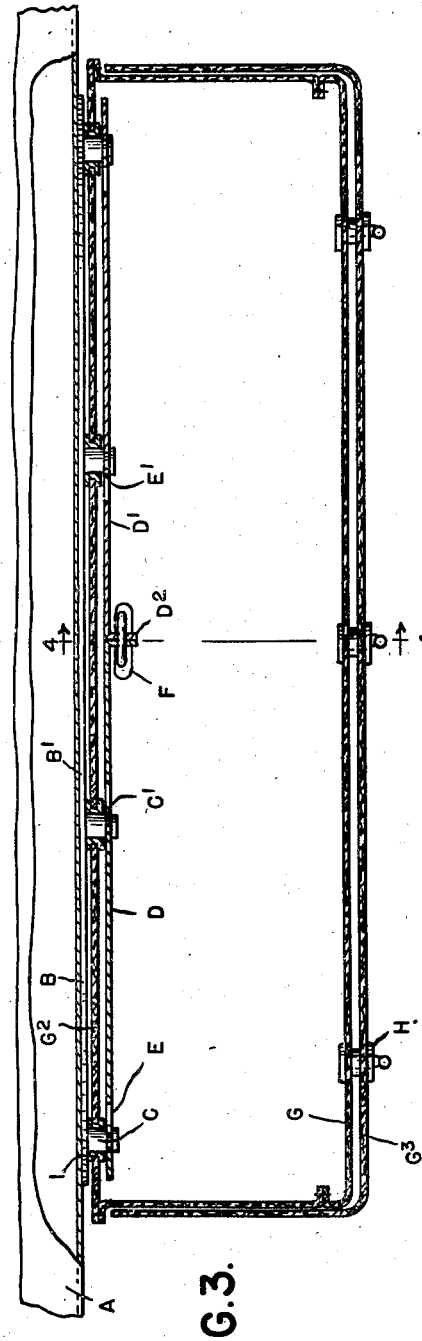
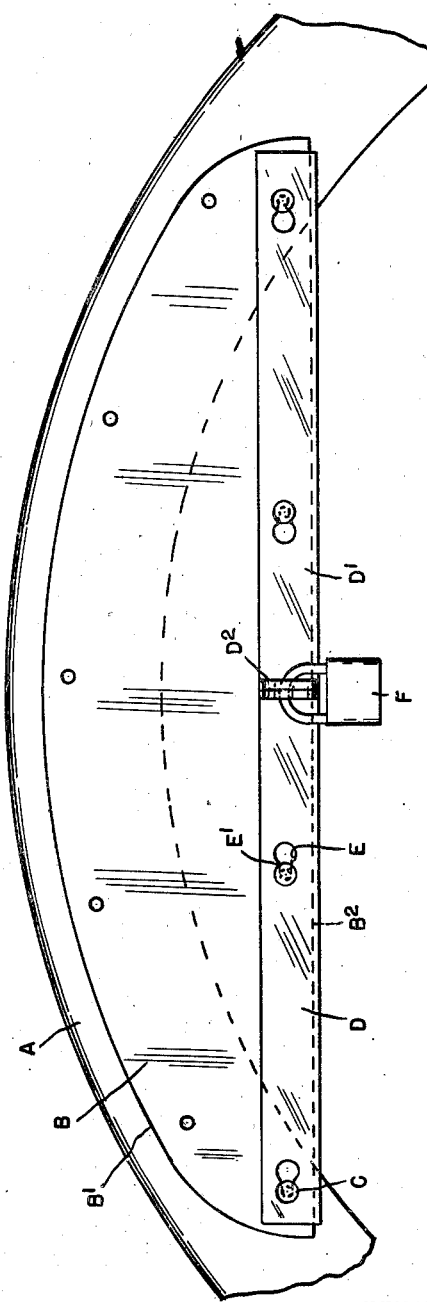
INVENTOR.
JOSEPH BUEGELEISEN
BY Whittemore Hulbert & Belknap
ATTORNEYS Patented June 24, 1947

2,423,003

UNITED STATES PATENT OFFICE 2,423,003

MOTORCYCLE SADDLE BAG

Joseph Buegeleisen, Detroit, Mich.

Application March 11, 1946, Serial No. 653,474

3 Claims. (Cl. 224—32)

The invention relates to saddle bags designed for use on motorcycles and it is the object of the invention to obtain a construction in which the bag may be easily removed from the motorcycle frame when it is desired to do so and can be as easily replaced and locked to the frame. To this end the invention consists in the construction as hereinafter set forth.

In the drawings:

Fig. 2 is a side elevation of the frame with the bag removed therefrom;

Fig. 3 is a horizontal section through the bag and frame showing the locking mechanism for the bag;

Figure 1:
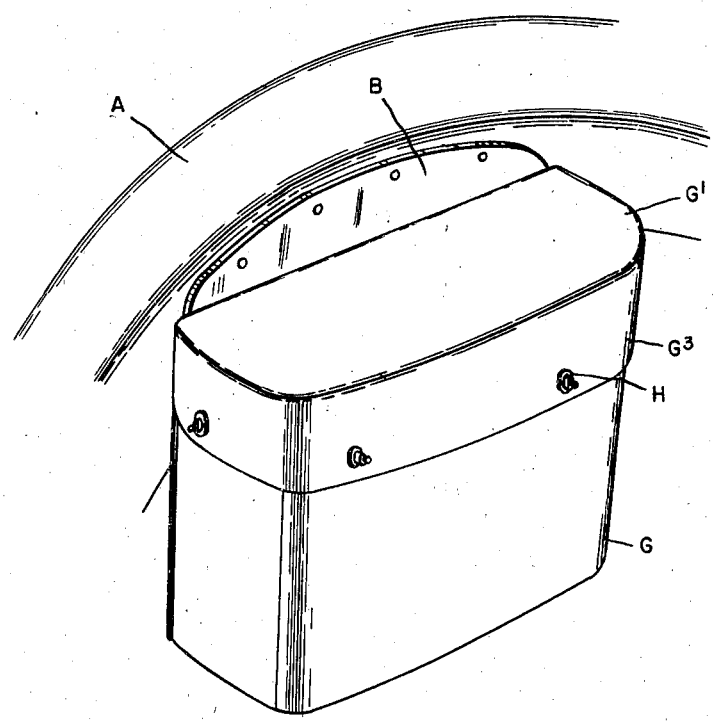
Fig. 1 is a perspective view showing the bag as mounted on the motorcycle frame.
Figure 4:
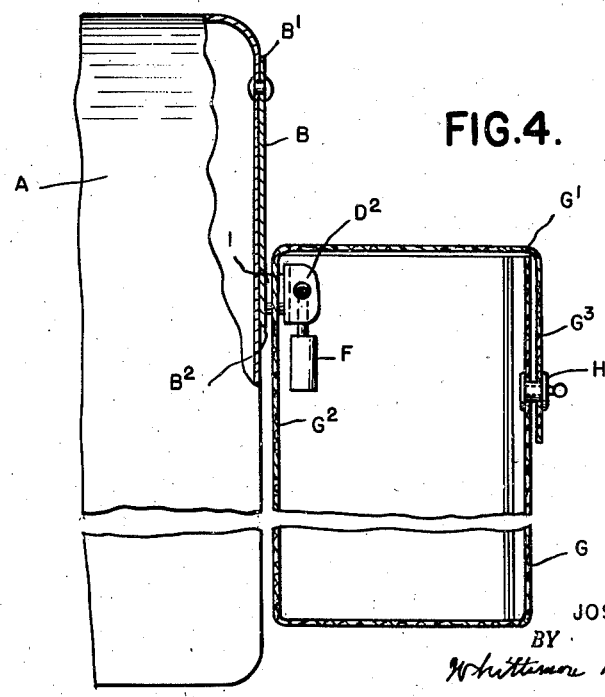
Fig. 4 is a cross section on line 4—4, Fig. 3.

A motorcycle saddle bag should be firmly attached to the cycle frame so as to withstand the shocks to which it is subjected during travel over the road and also to prevent theft when the cycle is unguarded. On the other hand, it is sometimes desirable to remove the bag and later to replace the same. I have, therefore, designed a construction in which the mounting for the bag is rigidly attached to the mud guard of the motorcycle and forms a reinforcement therefor and also a bag which is easily detached from and replaced upon said mounting. As illustrated, A is the mud guard for the rearwheel of a motorcycle. B is a plate which is riveted or otherwise permanently attached to the mud guard A so as to extend along the side thereof and to form a reinforcement therefor. The upper edge B' of the plate B is preferably curved to correspond to the curvature of the guard but its lower edge $B^2$ is straight and horizontal. Secured to and projecting outward from the plate B adjacent to its lower edge are studs C, each of which has near its outer end a groove C' for engagement with a locking bar. This bar is preferably formed in two sections D and D' each of which has therein apertures E for registration with the studs C and slots E' extending from said apertures for engaging the grooves C' in the studs. Each of these bars has an outwardly extending angle portion $D^2$, which portions when moved in contact with each other will adjust the bars to engage the slots E' with the groove C'. A locking means, such as a padlock F, may be used for holding the portions $D^2$ together and in this way preventing the bars D and D' from being detached from the studs. G is the saddle bag preferably formed of leather and preferably having a cover portion G' hingedly secured to the rear wall $G^2$ of the bag and provided with a depending flange portion $G^3$ detachably secured to the bag by fasteners H. The rear wall $G^2$ is provided with a series of grummets I respectively positioned to register with the studs C so as to permit of engagement with the same. To mount the bag the locking bars D and D' are first removed from the studs. The grummets I are then engaged with the studs after which the locking bars are again engaged with the studs and locked thereto. As these locking bars are on the inside of the bag, they are normally concealed from view.

The construction as above described is one which securely attaches the bag to the motorcycle frame and on account of the reinforcement of the mud guard by the plate B, all stresses incident to road shocks are adequately taken care of. At the same time the plate B constitutes an ornament to the frame when the bag is removed as its front face may be chromium plated or otherwise decorated. Whenever it is desired to remove the bag, all that is necessary is to release and slide the locking bars D and D' so as to register the apertures E therein with the studs. These bars may then be detached and the bag removed by sliding the grummets I off from the studs C. To avoid carrying the locking bars with the bag, they may be replaced on the studs after the bag is removed and locked from detachment by the padlock F. The bag may be removed by first detaching the locking bars, then disengaging the studs from the grummets and finally replacing the locking bars and securing them in locked position by the padlock F.

What I claim as my invention is:

1. A detachable saddle bag for motorcycles and a mounting therefor comprising a plate permanently attached to a mud guard of the motorcycle adjacent to a side thereof and forming a reinforcement therefor, said plate having its upper edge substantially corresponding to the curvature of the guard and its lower edge substantially horizontal, a series of studs projecting outward from said plate, a saddle bag having grummets therein for respectively registering with said studs, and a locking bar within the bag for engaging the portions of the studs projecting beyond said grummets.

2. A detachable saddle bag for motorcycles and a mounting therefor comprising a plate permanently attached to a mud guard of the motorcycle adjacent to a side thereof and forming a reinforcement therefor, said plate having its upper edge substantially corresponding to the curvature of the guard and its lower edge straight and substantially horizontal, a series of studs projecting outward from said plate adjacent to the lower edge thereof, a locking bar apertured to engage certain of said studs, each aperture having an extension slot on one side thereof for engaging a groove in the stud, means for locking said bar against movement for disengaging the same from said studs, and a saddle bag provided with grummets for registration and engagement with the respective studs, said bag when engaged with said studs being held by said bar and locking means from detachment and said bar being itself replaceable on said studs to be locked thereto after the bag has been removed.

3. A detachable saddle bag for motorcycles comprising a plate permanently attached to the mud guard adjacent to a side thereof and forming a reinforcement therefor, said plate having its upper edge substantially corresponding to the curvature of the guard and its lower edge straight and substantially horizontal, a series of studs projecting outward from said plate adjacent to the lower edge thereof each stud having a groove therein, a pair of locking bars respectively apertured to engage certain of said studs, each aperture having an extension slot on one side thereof for engaging the groove in the corresponding stud whereby said bars when moved towards each other will be interlocked with all of said studs, a bag having grummets for respectively registering with said studs, said bag being engageable with said studs upon the removal of said locking bars and subsequently upon replacement of said bars being held thereby from disengagement from said studs, and locking means for holding said bars from relative movement to prevent disengagement from said studs.

JOSEPH BUEGELEISEN.

REFERENCES CITED

The following references are of record in the file of this patent:

UNITED STATES PATENTS

| Number | Name | Date |
| --- | --- | --- |
| 1,963,333 | Morales | June 19, 1934 |
| 2,109,315 | Harley | Feb. 22, 1938 |

FOREIGN PATENTS

| Number | Country | Date |
| --- | --- | --- |
| 446,331 | Great Britain | Apr. 28, 1936 |